Figure 1:
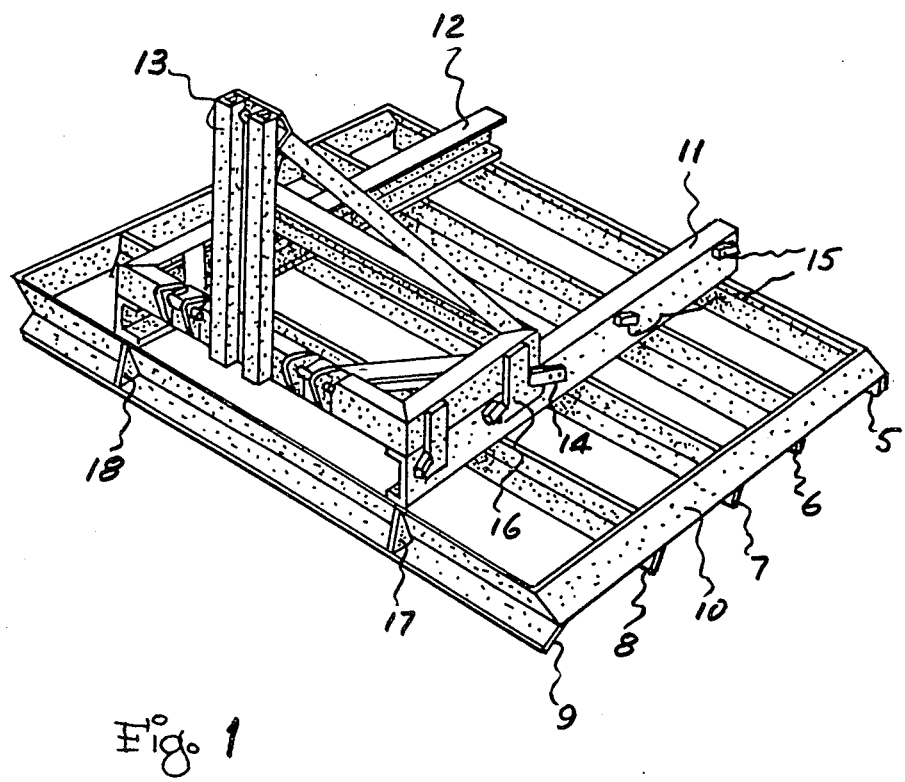

United States Patent [19]

Smith

[11] 4,196,778
[45] Apr. 8, 1980

[54] PARTICULATE MATERIAL SPREADER WITH SELECTIVELY DETACHABLE THREE-POINT LINKAGE

[76] Inventor: Charles J. P. Smith, 274 Forest Rd., Bexley, N.S.W., Australia, 2207

[21] Appl. No.: 853,860

[22] Filed: Nov. 22, 1977

[51] Int. Cl.$^2$ .................... A01B 49/02; A01B 31/00
[52] U.S. Cl. .................... 172/199; 172/248; 172/451; 172/767; 280/408; 280/415 A; 280/461 A
[58] Field of Search ............... 172/72, 189, 193, 194, 172/197, 198, 199, 200, 245, 248, 250, 387, 391, 393, 439, 451, 612, 677, 687, 689, 702, 712, 767, 770, 780; 37/10, 13, 51; 280/408, 415 R, 415 A, 456 A, 460 A, 461 A, 491 E

[56] References Cited

U.S. PATENT DOCUMENTS

| | | | |
|---|---|---|---|
| 212,393 | 2/1879 | Mulvey | 172/393 X |
| 1,252,588 | 1/1918 | Knapp | 280/408 |
| 1,578,011 | 3/1926 | Calkins | 172/767 X |
| 1,845,324 | 2/1932 | Noffsinger et al. | 172/199 X |
| 1,851,064 | 3/1932 | Reifschneider | 172/393 |
| 1,875,492 | 9/1932 | Pridgen | 172/780 |
| 2,731,896 | 1/1956 | Wurster | 172/451 X |
| 3,556,228 | 1/1971 | Mork | 172/199 |
| 3,846,923 | 11/1974 | Whittier | 172/439 X |
| 4,082,150 | 4/1978 | Winkles | 172/780 |

FOREIGN PATENT DOCUMENTS

| | | | |
|---|---|---|---|
| 117395 | 8/1969 | Norway | 172/197 |
| 178267 | 2/1962 | Sweden | 172/439 |
| 278200 | 1/1952 | Switzerland | 172/439 |
| 813809 | 5/1959 | United Kingdom | 172/451 |

Primary Examiner—Richard T. Stouffer
Attorney, Agent, or Firm—Stevens, Davis, Miller & Mosher

[57] ABSTRACT

A particulate material spreader comprising a ground-contacting platform adapted for detachable connection to towing device which causes the platform to traverse the ground so as to engage at least in part the surface thereof subtended by the platform. Engagement is by one or more members supported by the platform transversely with respect to the transit path of the platform. Each member has at least one vertically resolvable surface irrespective of the attitude of the platform. The connection is such that a pre-set angle of the platform with respect to a horizontal plane is maintained during transit whereby the members gouge relatively high areas of engaged ground and fill relatively low areas thereof with spoil from those high areas. The platform is attached to the towing device by a selectively detachable three-point linkage which may be mounted on one end or the other of the platform.

1 Claim, 4 Drawing Figures

PARTICULATE MATERIAL SPREADER WITH SELECTIVELY DETACHABLE THREE-POINT LINKAGE

The platform is attached to the towing device by a selectively detachable three-point linkage which may be mounted on one end or the other of the platform.

SPECIFICATION

This invention relates to spreading or contouring devices for friable material, and more particularly to means for spreading soft soil or the like upon lawns or other ground surfaces, and/or for the levelling of such surfaces.

Attempts have been made to carry out spreading and/or levelling processes using a so-called grader, which comprises an angled blade constrained in its forward path with respect to the ground by mounting said blade nearly vertically upon a wheeled vehicle so as to depend therefrom. However, graders are not only expensive and slow in operation but necessarily require the services of a skilled driver able to judge the blade position and also employ a correct steering technique to compensate for the displacement of spoil to one side.

Attempts have also been made to spread soil by drawing or towing a platform supporting a plurality of bars, said platform being pivotally mounted on one end of a handle, the bars being positioned transversely to the longitudinal axis of the handle, and the shape of the bars being such that the undersurface portion of each bar was substantially flat and the face of each bar adjacent said portion was substantially vertical, whereby said platform tended to conform with a lawn or other ground surface traversed by said platform.

However, although the last-mentioned device was capable of spreading a mass of sufficiently soft soil, it suffered from the disadvantage that it was not adapted to level undulating surfaces of ground containing harder soil.

It is an object of the present invention to overcome the above and other disadvantages and to provide a device which is not only capable of dealing with soft soil but is adapted to convert compacted soil temporarily to a friable condition to permit its fluid motion in particulate form.

Figure 2:
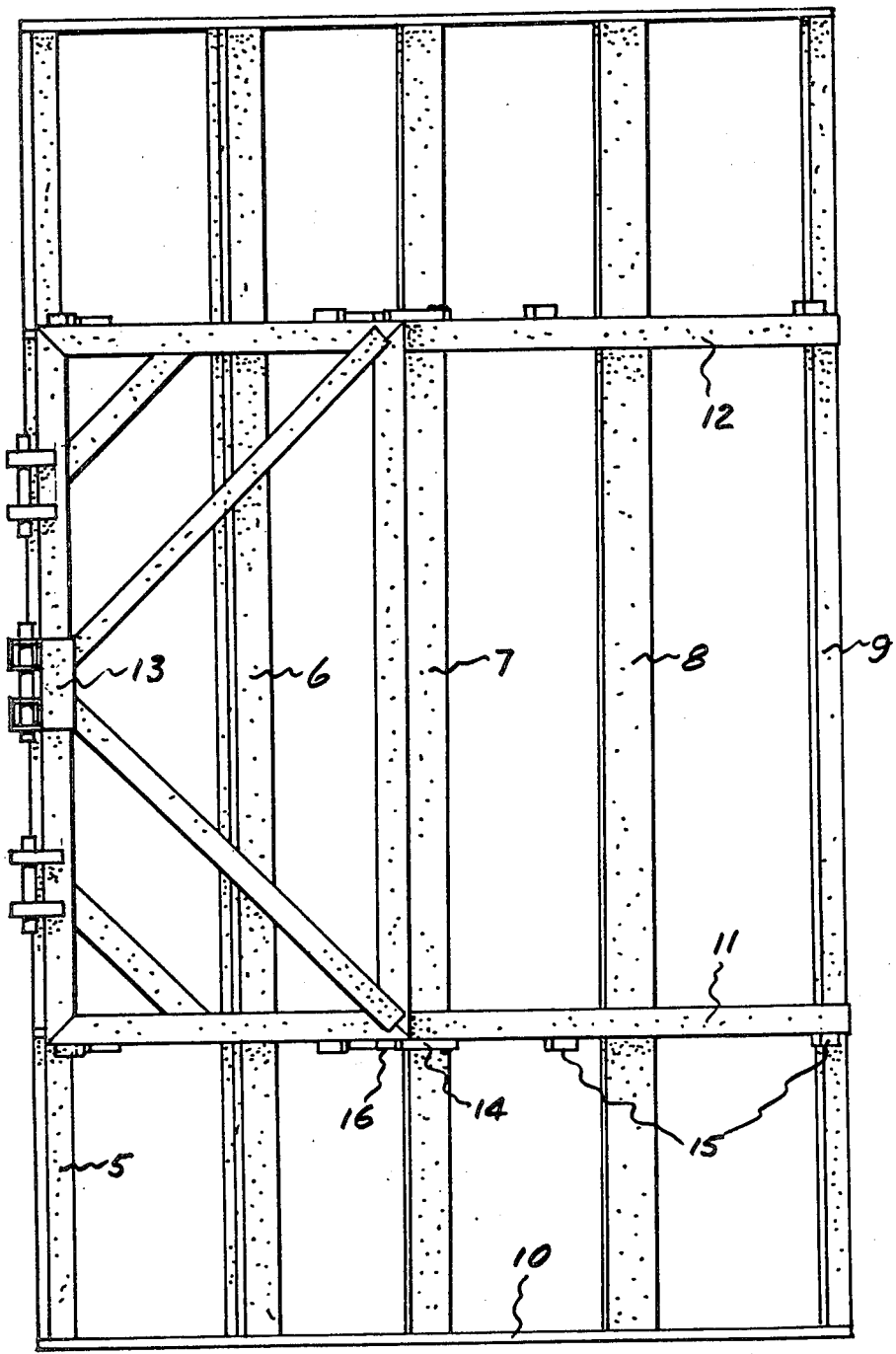
Figure 3:
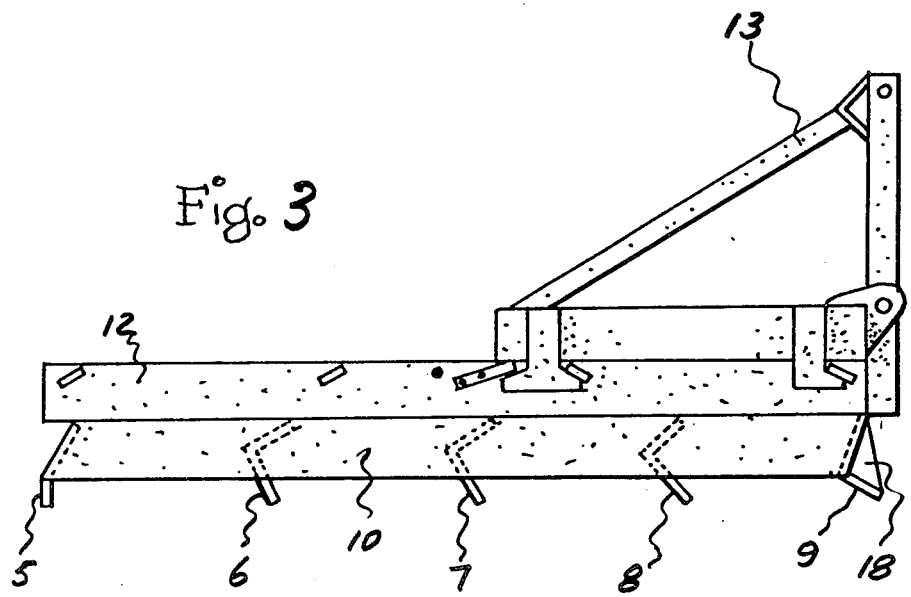
Figure 4:
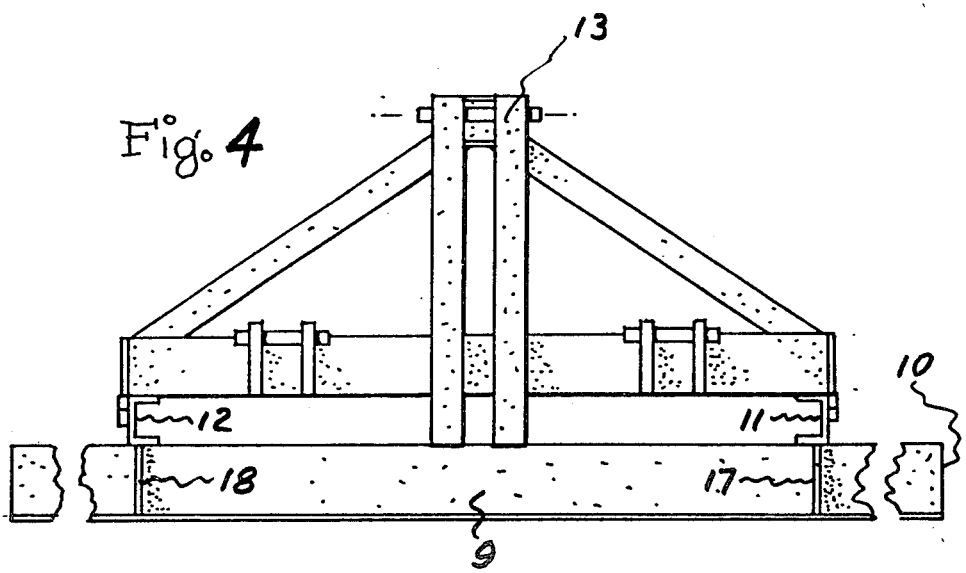

According to the invention therefore, in one of its aspects, a spreading and/or contouring device comprises a ground-contacting platform adapted for detachable connection to towing means which causes said platform to traverse said ground so as to engage at least in part the surface thereof subtended by said platform, the engagement being via one or more of a plurality of members supported by said platform transversely with respect to the transit path of said platform, and each said member having at least one vertically resolvable surface irrespective of the attitude of said platform, and said connection being such that a pre-set angle of said platform with respect to a horizontal plane is maintained during transit whereby said members gouge relatively high areas of engaged ground and fill relatively low areas thereof with spoil from said high areas. Certain particular embodiments of the invention will now be described herein with reference to the accompanying drawings, in which similar references indicate corresponding parts, and in which:

FIG. 1 shows, in perspective view, a preferred embodiment of the invention wherein said members are more nearly vertical near the rear of said platform but inclined progressively from the vertical towards the front thereof, FIG. 2 shows, in plan view, the apparatus of FIG. 1, FIG. 3 shows, in side elevation, the apparatus of FIG. 1, and FIG. 4 shows, in end elevation, from the towing position, the apparatus of FIG. 1. Upon referring to the drawings it will be seen that said members may comprise typically a plurality of angle sections 5, 6, 7, 8, and 9, spaced apart and fitted within a substantially rectangular frame 10, said angle sections and the components of said frame being fabricated from any rigid solid material in known manner, but preferably being composed of mild steel or the like. The ends of the angle sections may be fixed to the end members of the frame 10 by welding or otherwise. If desired the angle sections may be formed by bending from simple plates before assembly to have the progressively changing inclination shown, or they may be selected from an available range of prefabricated units. This progressively angular arrangement has been found to produce a better "cleaning-off" effect, but if desired, in simpler installations, the member may be provided with scraping surfaces all of which are substantially vertical as in the case of member 5.

Said connection may comprise the three-point tractor linkage 13 which is supported rigidly with respect to the frame 10 via the rails 11 and 12. Because of this rigid attachment the angle with which the platform is held with respect to the ground is constantly under the control of the operator of a towing tractor. In practice, said platform would be held in a nearly horizontal position and the tractor progressed. Preferably means such as the quick-acting fastening lug 14 is provided at each side of the three-point linkage 13 to permit rapid detachment of the linkage from the platform, whereby the tractor may be driven around to the other side of said platform and backed into position wherin it may be again quickly locked rigidly with respect to the rails 11 and 12 via lugs such as 15 which engage the dogs such as 16. This arrangement also permits the replacement of the frame 10 after the members have undergone normal wear, without the necessity also to replace the more expensive upper structure comprising the three-point linkage 13. The frame 10 is nevertheless made very rugged since it is fitted throughout with gussets such as 17 and 18 which are attached to the separate members by welding or otherwise.

In use, the material to be spread, such as soil upon a lawn or gravel or metal upon a foot-path, is dumped at random by shovel or barrow over an area to be treated and then the device, according to the invention, is pulled across said area by the tractor operator who holds said platform approximately horizontally with respect to the ground surface. As the tractor progresses, the members are held laterally substantially parallel to the ground surface and are moved down so as to engage the ground to the desired degree as the surface is traversed. The material gathered by the members piles up in the spaces therebetween and drops into any hollows in the surface where required and is thus spread evenly over a large area. Because the substantially horizontal platform is not required to accept the total volume of soil or the like on impact, it undermines the dump and progressively picks up the total volume at speed proceeding along the prescribed course and dropping the appropriate quantity of soil by bridging level deficiencies. In effect, the device is used to "iron" the material evenly over the lawn or other surface. Likewise, it may be used for finally levelling the surface of an area of soft soil or sand or the like preparatory to the planting of a lawn or for the top-dressing of an existing lawn or for preparing the surface of a seed bed for any other operation which requires a level surface. However, because of the positive guidance of the platform in accordance with the invention, the latter no longer simply conforms with the local ground surface but actually cuts or gouges the high spots to fill the valleys, and if any surplus friable material is left at the end of a run it may simply be deposited at a point where it can be subsequently easily picked up. Furthermore this action is one requiring the minimum of skill since there is no lateral displacement of the soil as the tractor progresses, and furthermore it may be carried out at a relatively high speed of the order of 25 kilometers per hour in contrast with such devices as graders which rarely proceed at more than a walking pace. In fact, it has been found in tests leading to the invention, that the action is more efficient if carried out relatively fast, thereby preventing the members from digging in. In one such test, the task of top-dressing a playing field was carried out in one tenth of the time previously required when using prior art systems.

In a modification of the invention, harrow tines (not shown) may be fastened detachably to the underside of said platform, for example to one or more of the members 5, 6, 7, 8, or 9, or to frame 10 itself, for the purpose of breaking up especially compacted soil beforehand, prior to traversing it in the manner above described, or for the purpose of aerating already treated surfaces. Said tines may of course be readily detached before returning the device to its normal format. The use of this modified form of the invention dispenses, of course, with the need for a separate harrow of known kind, and thus significantly reduces costs.

The claims defining the invention are as follows:
1. A towed particulate material spreader comprising
a platform frame;
a plurality of spaced parallel blade members fixed to said frame, each said member having at least one vertically resolvable surface irrespective of the attitude of said platform frame and each of said members having its cutting portion projecting from the bottom of said frame;
a pair of parallel rails fixed to the top of said frame transversely to said members, said rails having fastening lugs attached to both their exterior sides, said lugs being divided into first and second sets,
said first set of lugs being associated with one end of said pair of parallel rails and said second set of lugs being associated with the other end of said pair of parallel rails, said first set of lugs being attached to said rails closer to said one end than said second set of lugs; and
a three-point towing linkage, the base of said linkage having fastening dogs on a forward end and a rearward end depending therefrom, said three-point linkage being selectively detachably mounted on said one end and said other end of said parallel rails, said first and second sets of lugs being so positioned on said rails that when said three-point linkage is mounted on said one end of said rails, said dogs engage said first set of lugs while being free of engagement with said second set of lugs and when said three-point linkage is mounted on said other end of said rails, said dogs engage said second set of lugs while being free of engagement with said first set of lugs, and said linkage having one of its said points above and between its other two points, said three points being on said forward end of said linkage.

* * * * *